United States Patent [19]

Kroft

[11] 4,370,710

[45] Jan. 25, 1983

[54] CACHE MEMORY ORGANIZATION UTILIZING MISS INFORMATION HOLDING REGISTERS TO PREVENT LOCKUP FROM CACHE MISSES

[75] Inventor: David Kroft, Thornhill, Canada

[73] Assignee: Control Data Corporation, Minneapolis, Minn.

[21] Appl. No.: 181,529

[22] Filed: Aug. 26, 1980

[51] Int. Cl.³ .......................................... G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,292,153 | 12/1966 | Barton | 364/200 |
| 3,840,862 | 10/1974 | Ready | 364/200 |
| 3,896,419 | 7/1975 | Lange | 364/200 |
| 3,928,857 | 12/1975 | Carter | 364/200 |
| 3,949,379 | 4/1976 | Ball | 364/200 |
| 4,047,157 | 9/1977 | Jenkins | 364/200 |
| 4,056,845 | 11/1977 | Churchill, Jr. | 364/200 |
| 4,095,269 | 6/1978 | Kawabe | 364/200 |
| 4,156,906 | 5/1979 | Ryan | 364/200 |
| 4,195,341 | 3/1980 | Joyce | 364/200 |

Primary Examiner—Gareth D. Shaw
Assistant Examiner—Stephen A. Soffen
Attorney, Agent, or Firm—William J. McGinnis, Jr.; Joseph A. Genovese

[57] ABSTRACT

A cache memory organization is shown using a miss information collection and manipulation system to insure the transparency of cache misses. This system makes use of the fact that the cache memory has a faster rate of operation than the rate of operation of central memory. The cache memory consists of a set-associative cache section consisting of tag arrays and control with a cache buffer, a central memory interface block consisting of a memory requester and memory receiver together with miss information holding registers section consisting of a miss comparator and status collection device. The miss information holding register section allows for an almost continual stream of new requests for data to be supplied to the cache memory at the cache hit rate throughput.

7 Claims, 4 Drawing Figures

TAG ARRAY CONTROL SPECIFICATION

| INPUT FUNCTION | PARTIALLY WRITTEN | TOTALLY WRITTEN | IN INPUT STACK | ALREADY ASKED FOR | ACTION |
|---|---|---|---|---|---|
| READ | NO | NO | NO | NO | SET SEND-TO-CPU BIT SAVE IDENTIFICATION CODE |
| READ | NO | NO | NO | YES | READ FROM CENTRAL MEMORY (BY PASS) |
| READ | NO | NO | YES | X | READ FROM STACK |
| READ | YES | NO | X | X | READ FROM CENTRAL MEMORY (BY-PASS) |
| READ | YES | YES | X | X | READ FROM CACHE BUFFER |
| PREFETCH | X | X | X | X | NO ACTION |
| WRITE | X | X | X | X | WRITE BYTES TO CACHE BUFFER/SET APPROPRIATE PARTIAL WRITE BITS |

WHERE X IS: DONT CARE

FIG. 3

CACHE MEMORY ORGANIZATION UTILIZING MISS INFORMATION HOLDING REGISTERS TO PREVENT LOCKUP FROM CACHE MISSES

BACKGROUND OF THE INVENTION

This invention relates to a cache memory organization for use with a digital computer system. In particular, this invention relates to a cache memory organization having lock up free instruction fetch/prefetch features. Also, this invention relates to a cache memory organization that overlaps execution unit requests of operands for processor instructions requiring more than one operand. This invention is directed to the problem caused when a cache memory receives an address request for data which is not in the cache. If there is a miss request to a cache memory, there is the possibility of a time delay penalty on subsequent address references to the cache memory, even if the subsequent data is present in the cache memory. The penalty is caused by the necessity of waiting until the missed requested data is received from central memory into the cache memory organization. Some prior art even requires the missed data to be received from central memory and updated into the cache prior to availability for output.

Known to applicant as prior art is U.S. Pat. No. 3,949,379 entitled, "Pipeline Data Processing Apparatus With High-speed Slave Store." This patent only touches on the idea of a cache memory, or as referred to in the patent a slave store, with respect to the lockout prevention feature after a missed address where data is not present in the slave store. Most of the lockout prevention in the subject patent is accomplished by providing three separate slave stores. The remaining lockout prevention feature shown in the patent is accomplished by allowing a block update for a previous missed address parallel with subsequent accesses through the use of a write memory register. This latter lockout prevention, however, is only accomplished in the most trival situations where, for example, only one block of data may be updated at a time, or where there are no accesses to a block of data being updated or where there can only be one write instruction to each word of the block on each total block update. This is described in columns 5 and 6 of the patent. In summary, the patent shows the possibility and benefit of lockout prevention for a slave store or cache memory but only proposes such use in the simpliest of cases. Note that there is a high probability of accessing another word in the same block of data, the principle behind the utility of a cache memory called lookaside. The present invention described herein extends lockout prevention to a point where a single cache memory store can effectively be used.

Another patent known to applicant is U.S. Pat. No. 3,896,419 entitled, "Cache Memory Store in a Processor of a Data Processing System." This patent shows the possibility of lockout prevention for a cache memory but only prevents lockout for storing operations as described in column 2. The cache memory organization according to that invention also allows autonomous nonoverlapped blocked loadings as described in column 2, but there is a lockout situation on a miss or no match situation as described in column 4 of that patent. The present invention, described herein not only prevents lockout on up to a predetermined number of miss situations but also allows for matching on data in transit from a backing store or main memory with block loading of the cache buffer totally autonomous and completely overlapped. Note that in the invention described in the patent, only the loading of the cache buffer after the data has been received from main memory is overlapped.

Another patent known to applicant in the prior art is U.S. Pat. No. 3,928,857 entitled, "Instruction Fetch Apparatus With Combined Look-ahead and Look-behind capability". This patent also describes the problem of instruction unit lockout due to memory contention. The solution described is to provide a separate instruction buffer to move the memory contention situation from between the operand fetch and the instruction fetch portions of the cycle to the operand fetch and instruction prefetch portions of the memory cycle. If the instruction buffer shown in this patent were to be sufficiently large with operand fetch features, this contention problem could be essentially eliminated. Another way to solve the problem shown in the patent is to provide as described in the invention herein is a cache buffer memory for both operands and instructions with a mechanism to prevent lockout in a miss situation. Further, the invention of this patent does not solve the problem of cache memory lockout due to a miss on the first access of a many operand access instruction. This is the situation where all memory accesses are from the execution unit. Also, in this proposed multiple store situation, there is a significant problem when the data in more than one of the stores is possibly the same piece of data and updating becomes extremely cumbersome. A single cache memory buffer organization simplifies this situation.

There are many other patents relating to cache memories such as U.S. Pat. Nos. 4,095,269; 4,195,341; 3,292,153; 4,056,845; and 4,047,157 but none of these patents is at all related to the prevention of the cache memory lockout situation on a miss.

SUMMARY OF THE INVENTION

A cache memory organization according to the present invention consists of a memory requester, a cache memory, a memory receiver, a selection network for providing addresses to the memory, a tag arrays and control unit for providing one source of addresses and data to the selection network, a plurality of miss information holding registers, an input stack and a miss comparator and status collection network connected to the miss information holding registers. The miss information holding registers provide another source of address information to the selection network for the cache memory. The data for this other source of input to the selection network is from the input stack. When a request for data is made to the cache memory, this request is termed a miss if the requested information is not in the cache memory. On a miss, requests for a block surrounding the required datum are made to the central memory and the miss information holding registers holds the required addresses while central memory is accessing the information. Meanwhile the cache memory is not locked up and continues responding to the flow of requests to it. When the data comes from the central memory, the memory receiver unit interrogates the miss information holding registers indicating the status of this previously missed information so that the previously missed information can be output if required as well as stored properly in the cache memory. Also, while the previously miss information block is in transit from memory, data from it may be requested by either the instruction or executing units and the status held in the miss information holding registers updated accordingly for output; the central memory is not accessed unless necessary.

DESCRIPTION OF THE PREFERRED EMBODIMENT

Figure 1:
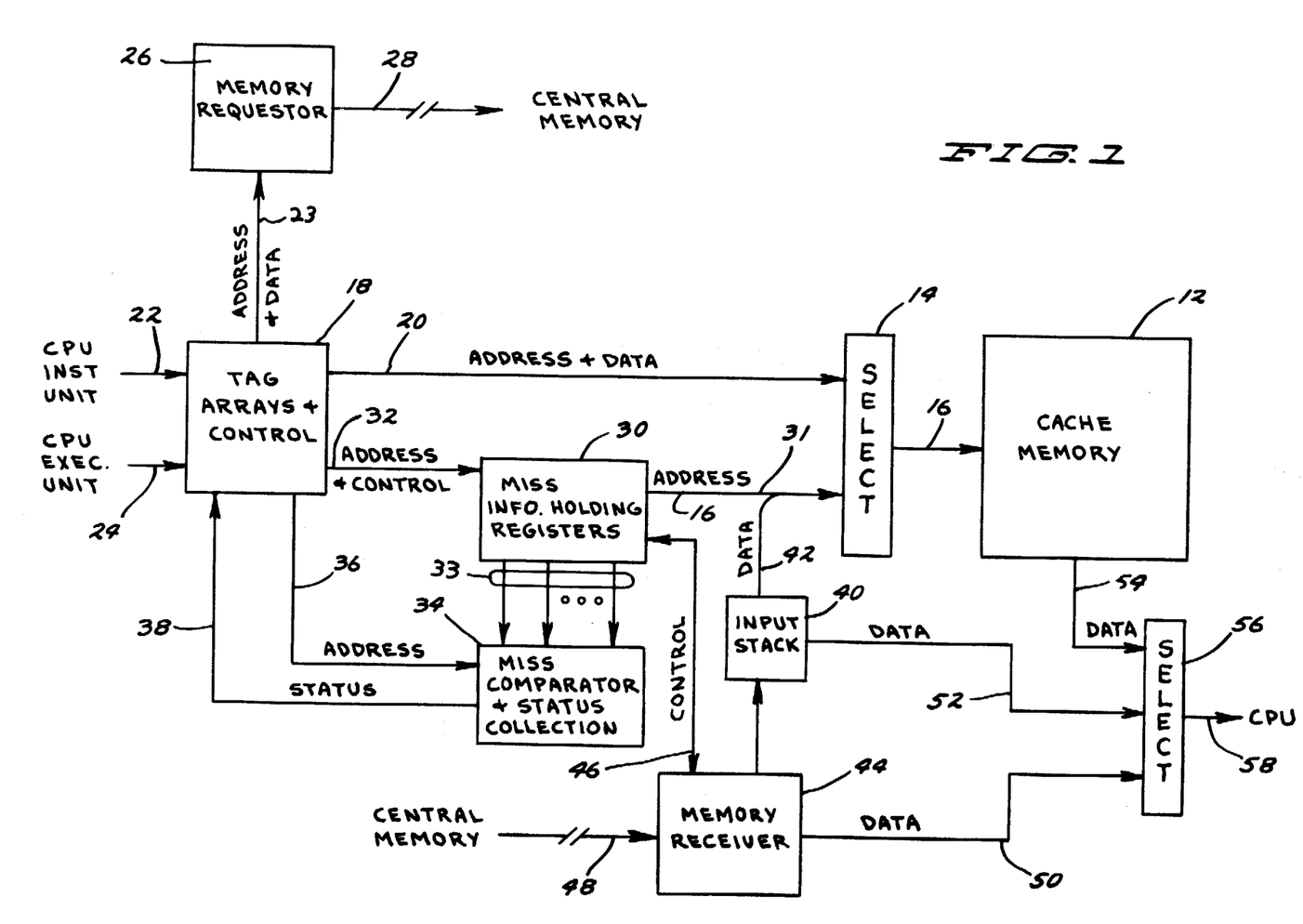
FIG. 1 is a block schematic of a cache memory organization according to the present invention.

With reference to FIG. 1, a cache memory organization 10, according to the present invention is shown. A cache memory 12 is coupled by a bus 16 to a selection network 14 for cache memory address and data inputs. Selection network 14 has two possible inputs for the cache 12.

A tag arrays and control unit 18 is coupled by an address and data bus 20 to the selection network 14. The tag arrays and control unit 18 receives inputs from central processing instruction unit on bus 22 and from central processing execution unit on bus 24. The tag arrays and control unit 18 has a central memory address and data bus 23 connecting with a memory requestor unit 26 which couples to a computer central memory by bus 28. A miss information holding registers unit 30 provides another input for cache memory address to selection network 14. Miss information holding registers unit 30 also receives an input from the tag arrays and control unit 18 by way of on addresses and control bus 32. The addresses received by unit 30 are both the input requested and cache memory addresses.

A miss information and status collection network 34 is connected by a plurality of address and status bus lines 33 to the miss information holding registers unit 30. The miss comparator and status collection network 34 receives the input requested address on bus 36 from the tag arrays and control unit 18 and outputs status information on bus 38 to the tag arrays and control unit 18.

An input stack unit 40 provides the second data input to selection network 14 on data bus 42 which is combined with the address bus 31 from the missed information holding registers unit 30 to form the entire second input to the selection network 14. Input stack 40 receives data from a memory receiver unit 44 which in turn receives the output from the computer central memory on bus 48. A control path 46 exists between memory receiver 44 and the missed information holding registers unit 30. Data may be output from the memory receiver unit 44 directly on data path 50 to a selection network 56 which has an output 58 connected to the central processing units of a computer system. The input stack 40 also has a data path 52 connected with the selection network 56. Finally, the cache memory 12 has a data output path 54 connected to the selection unit 56 so that any one of three data input may be selected as an output to the central processing units of a computer system.

Figure 2A:
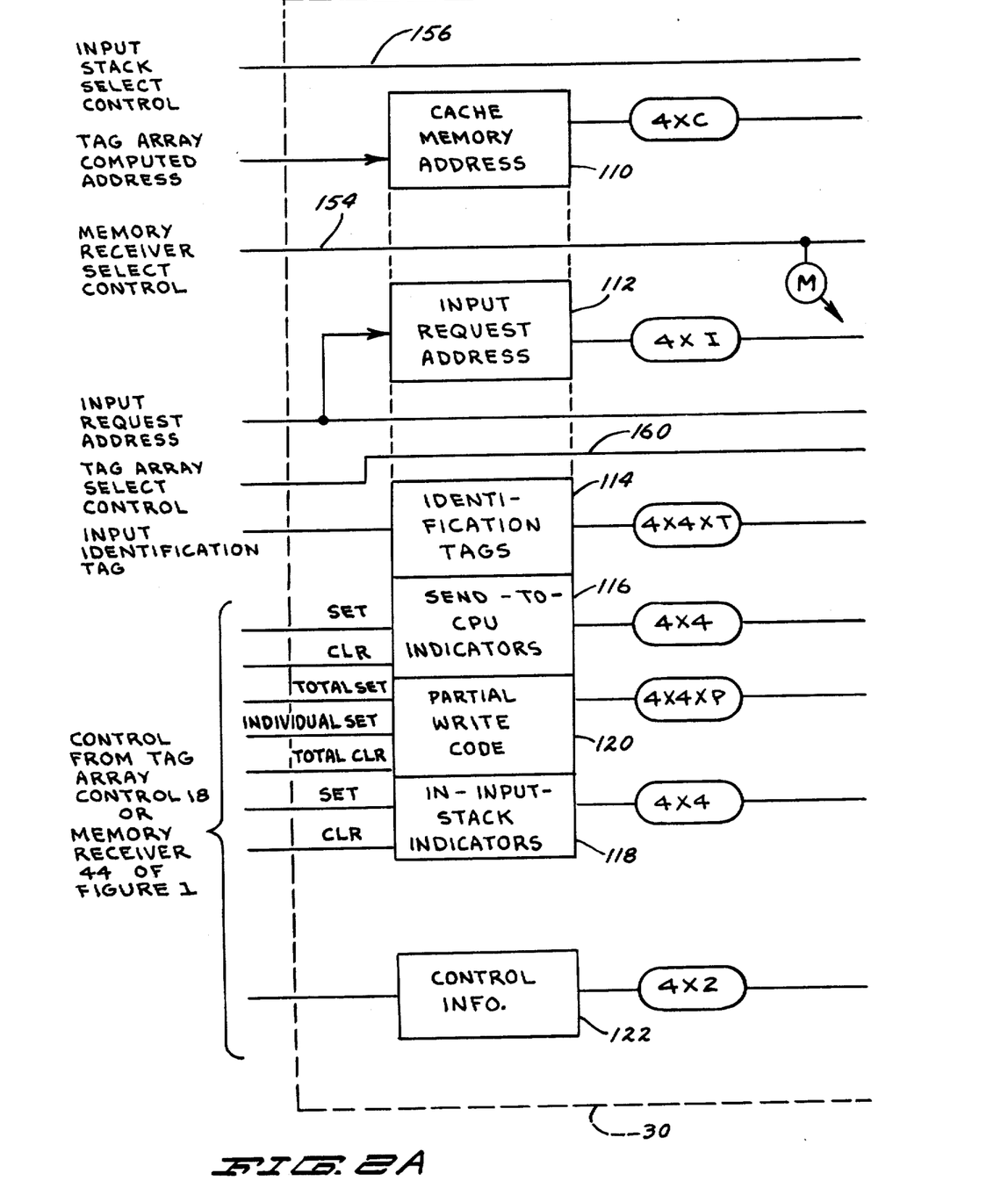
FIGS. 2A and 2B are viewed in left to right order and consist of a block schematic of the miss information holding registers unit 30 and miss comparator and status collection unit 34.
Figure 2B:
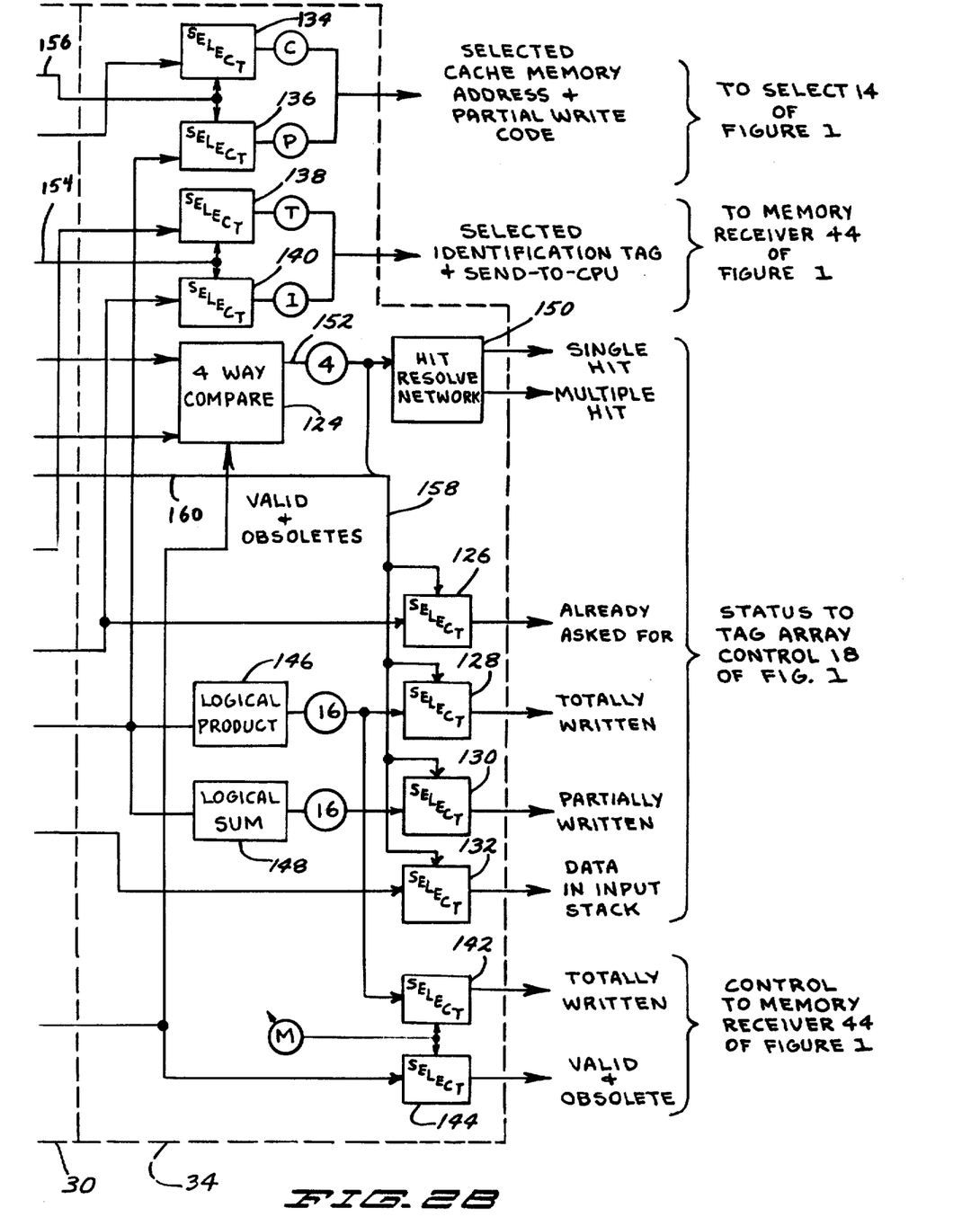

In FIGS. 2A and 2B, the organization of the miss information holding registers unit 30 and the miss comparator and status collection unit 34 is shown. The miss information holding registers are in turn composed of a four fold plurality of separate registers: A, cache memory address register 110; B, input request address register 112; C, identification tags register 114; D, send-to-CPU indicators register 116; E, in-input-stack indicators register 118; F, partial write code register 120; and G, control information register 122. Registers 110, 112, 114, 116, 118, 120, 122 feed the miss comparator and status collection unit 34. The miss comparator and status collection unit 34 is composed of a four way comparator 124, a set of selectors 126, 128, 130, 132 to send status information to the tag array control 18, a set of selectors 134, 136 to send the cache memory address and partial write code to select 14, a set of selectors 138, 140, 142, 144 to send control, selected identification tag and send-to-CPU indicator to the memory receiver 44, two networks, 146, 148 to form the logical product and logical sum respectively for totally written and partially written status, and hit resolve network 150 to determine from the four compare outputs 152 single and multiple hit status for the tag array control 18. The selectors 138, 140, 142, 144 have a selector control, 154, coming from the memory receiver, 44; this selector control 154 is derived from the central memory returned identification code. The selectors 134, 136 have a selector control, 156, which is derived from the delayed selector control, 154. The selectors, 126, 128, 130, 132 have a selector control 158 composed of the comparator output lines, 152, and the tag array select control 160. The tag array select control is derived from the lower order input request address bits.

In the past several years, the literature relating to computers has more than amply described various cache memory organizations which exploit particular general programming idiosyncrasies in order to obtain a maximum hit rate. In this specification, the hit rate is defined as the probability that a requested item of data is resident in the cache memory. Some of these concepts are presented in the earlier referenced patents. None of the prior art exploits either the inherent dual input nature of the cache memory or the many-datum reference type central processor instructions. It has been found that no matter how high the cache memory hit rate is, a cache memory miss may impose a penalty on subsequent cache references. This penalty is the necessity of waiting until the missed requested datum is received from central memory and possibly for cache update. For certain cases, the cache memory references following a miss do not require the information of the data not resident in the cache and these are therefore penalized when the cache memory locks up.

By way of complete definition, a cache buffer memory is considered to be any small fast memory holding the most recently accessed data in a computer system and its immediately surrounding neighbors in a logical sense. Because the access time of this cache buffer memory is usually an order of magnitude faster than the main or central computer memory and the standard software practice is to localized data, the effective memory access time is considerably reduced in a computer system in which a cache buffer memory is included. The cost increment for the cache memory when compared with the cost of a central memory alone shows the cost effectiveness of the cache memory because of the reduced access time.

Much study has been given to the design of cache memory in particular the problem of selecting the optimal total cache memory buffer size, the block size, the space allocation and replacement algorithms in order to maximize hit rate. In this specification, the block size is defined as the number of bytes to be requested on a cache miss. Another method of optimizing cache memory performance to increase the hit rate is to provide for selective prefetching. Such methods assume that a cache memory can handle only one request at a time and that on a miss the cache memory stays busy sevicing the request until the data is received from main memory. This is referred to as cache memory lockup or input lockout.

The present invention increases the effectiveness of a normal cache memory by exploiting the inherent dual input nature of the cache memory and many data reference instructions. In other words, it would be extremely useful to pipeline the request into the cache memory, regardless of any misses, at the cache memory hit throughput rate. In this situation, instruction fetch and/or prefetch would be totally transparent to the computer execution unit. For instructions that require a number of data references, their request can be almost entirely overlapped. It is not necessarily possible without prohibitive cost at this time to stream requests into the cache memory at the hit throughput rate indefinitely. There is a limit assuming a reasonable cost system that would occur if there are a number of misses close together. This limit is imposed by the number of misses that have not been completely processed that the cache memory will keep track of simultaneously without input lockout. Other prior art cache memory organizations' input stream rate is entirely dependent on hit rate.

The miss information holding register unit 30 contains one unresolved miss information/status holding register for each miss that will be handled concurrently. The miss comparator 124 is a dedicated n way comparator where n is the number of registers in unit 30 for registering hits on data in transit from the central memory of the computer system. The input stack 40 is required to hold the total number of received data words possibly outstanding. The size of the input stack of 40 is consequently equal to the block size in words time the number of miss information holding registers incorporated in unit 30. In the present invention, it has been determined that four miss information holding registers in unit 30 appears to be an optimal number for the cost effectiveness of the design implemented. It is obvious, within the scope of the invention, that more or fewer miss information holding registers could be provided depending on the needs of the application. The more registers provided, the closer one approaches the theoretical limit of the cache hit throughput rate.

Referring again to FIG. 1, the cache memory system employed may be more particularly described as a set associative cache memory using a tag arrays and control system 18 and a cache memory 12 which by themselves are old in the art. Similarly, the central memory interface blocks consisting of the memory requestor unit 26 and the memory receiver unit 44 are by themselves old in the art. The particular elements shown in the figure which relate to the improvement of the present invention are the miss information holding registers unit 30, the miss comparator and status collection network 34 and the input stack 40. The miss information holding registers hold all of the necessary information to both handle properly the central memory received data and also inform the main cache control unit by way of the miss comparator and status collection unit 34 of all hit and other status of data in transit from main memory. The input stack 40 is necessary to leave the main cache buffer available for overlapped reads and writes. This organization allows for data just received from main memory, or in the input stack to be sent immediately to the requesting central processing unit by way of selection unit 56 and data path 58.

The number of miss information holding registers in unit 30 is important. The incremental value, the decrease in the average system delay, of additional registers decreases rapidly with the numbers of registers with respect to the performance of the unit. The above is advantageous since the cost increases significantly with the number of registers used in implementing the system. The average delay time in this system is due to lockout on outstanding misses. This delay time, of course, is also dependent on cache memory input request and hit rates. In the degenerate case, one miss information holding register of reduced size is required for the present invention. Two missed information holding registers allow for overlap while one miss is still outstanding but lockup would occur in the cache memory input if multiple misses were outstanding. Cost considerations and incremental effectiveness considerations tend to indicate that four registers is optimal.

The necessary information to be contained within one of the miss information holding registers in unit 30 will now be described. First, the cache memory buffer address 110 for the cache memory 12 along with the input request address 112 are required to be stored. The cache buffer address is kept in order to know where to place the returning memory data from the computer main memory. The input request address is saved in order to determine if, on subsequent requests, the data requested is on its way from central memory. Second, input request indentification tags 114 along with the send-to-CPU (Central Processing Unit) indicators 116 are stored. The lines for the identification tags for input and central memory requests are not shown in FIG. 1 in order not to over complicate the diagram; the identification tag is associated with address on input and data on output. This information permits the cache memory to return to the central processing requesting units only the data requested and return it with its appropriate identification tag. Third, in-input-stack indicators 118 are used to allow for reading data directly from the input stack. Fourth, a partial write code 120 which for example, may be one bit per byte for each byte partial write, is held for each word to indicate which bytes of the words in transit that have been written in the cache memory. This code, therefore, controls the cache memory buffer write update and allows data for areas which have been totally written after a request to be disposed of. Thus, the cache memory has the capability of processing partial write input requests without a cache memory purge. This partial write code may not be incorporated if it acceptable in system design to purge a block of cache memory 12 on all partial write input requests or preferably, only on partial write input requests to a word in a block in transit from main memory. Finally, some control information 122 such as the valid data bit for the register, the obsolete bit for indicating that the register contains valid information only for returning requested data but not for cache buffer update or data in transit hits and the number of words of the block which have been received and written, if required, into the cache buffer are stored. Thus, each miss information holding register of unit 30 contains multiple registers each for holding particular items in forming a complete unit. These may be summarized as follows:
(a) cache buffer address; 110 (C bits)
(b) input request address; 112 (I bits)
(c) input indentification tags, one per word; 114 (T bits per tag)
(d) send-to-CPU indicators, one per word; 116 (1 bit per indicator)
(e) in-input-stack indicators, one per word; 118 (1 bit per indicator)
(f) partial write codes, one per word; 120 (P bits per code)
(g) control information; 122
(h) number of words of blocks processed; (2 bits per code)
(i) valid information indicator; and (1 bit per indicator)
(j) obsolete indicator for information not valid for cache update or miss information holding register hit on data in transit. (1 bit per indicator)

The operation of the present invention may be discussed in two basic sections. The first section relates to the memory receiver/input stack operations and the second relates to the tag array control operations. For memory receiver/input stack operations the fields in the miss information holding register unit that are interrogated are the following:
(a) send-to-CPU indicator;
(b) input indentification tags;
(c) cache buffer address;
(d) partial write codes;
(e) obsolete indicator; and
(f) valid indicator.

When a word is received from memory, it is sent to the CPU requesting unit if the send-to-CPU indicator is set. The appropriate identification tag accompanys the data. This word is also written into the input stack 40 if the word is not previously totally written into the cache memory 12 or the miss information holding register indicator is not obsolete. The words of data are removed from the input stack 40 on a first in, first out basis when the cache memory is available and are written to the cache memory 12 using the cache buffer address and partial write code fields. Of course the missed information holding register unit 30 must hold a valid information when interrogated or an error signal would be generated.

It is necessary to more completely explain cache memory data tagging. On a miss, the cache memory requests a block of words from central memory. Along with each word is sent a cache tag which points to the particular assigned miss information holding register in unit 30 and indicates which word of the block is actually to be accessed. Note that the cache memory organization saves in the miss information holding register of unit 30 the requesting unit's identification tag. This tagging closes the remaining open link for the handling of data returned from central memory and also removes all restrictions on memory relating to the order of response. That is, earlier requested words for a miss or misses may be returned out of order depending upon the central memory organization. This fact alone could restrict other cache memory organizations.

The fields of the miss information holding register unit 30 updated during memory receive/input stack operations are the following:
(a) in-input-stack indicators;
(b) partial write codes;
(c) number of words of block processed; and
(d) valid information indicator The in-input-stack indicators are set when the data word is written into the input stack 40 and cleared when the data is removed from the input stack and written into the cache buffer. The partial write code is also set to indicate totally written when the data word is written into the cache buffer. In addition, whenever a data word is disposed of due to being totally written or having an obsolete miss information holding register indication or is written into the cache memory buffer, the number of words processed counter is incremented. When the number of words processed counter overflows showing that all the words for a block have been received, the valid or used miss information holding register indicator is cleared.

For tag array control operation, the following fields of the miss information holding register unit 30 are interrogated:
(a) input request addresses;
(b) send-to-CPU indicator;
(c) in-input-stack indicators;
(d) partial write codes;
(e) valid indicator; and
(f) obsolete indicator.

The fields designated (a), (e) and (f) are used along with the current input request address and the comparator unit 34 to determine if there is a hit on a previously missed data still being handled, that is a previous miss hit. As denoted in FIG. 3, the partial write codes will be set appropriately on a previous miss hit with a write input function. A partial write code is associated with the address lines 20, 31 and 32 of FIG. 1. Fields (b), (c), and (d) produce the following status for the previous miss hit:
(a) partially written, meaning that the partial write code has at least one bit set (logical sum);
(b) totally written, meaning that the partial write code is all set to ones (logical product);
(c) in-input-stack and
(d) already asked for, meaning that the send-to-CPU indicator is already set.

Figure 3:
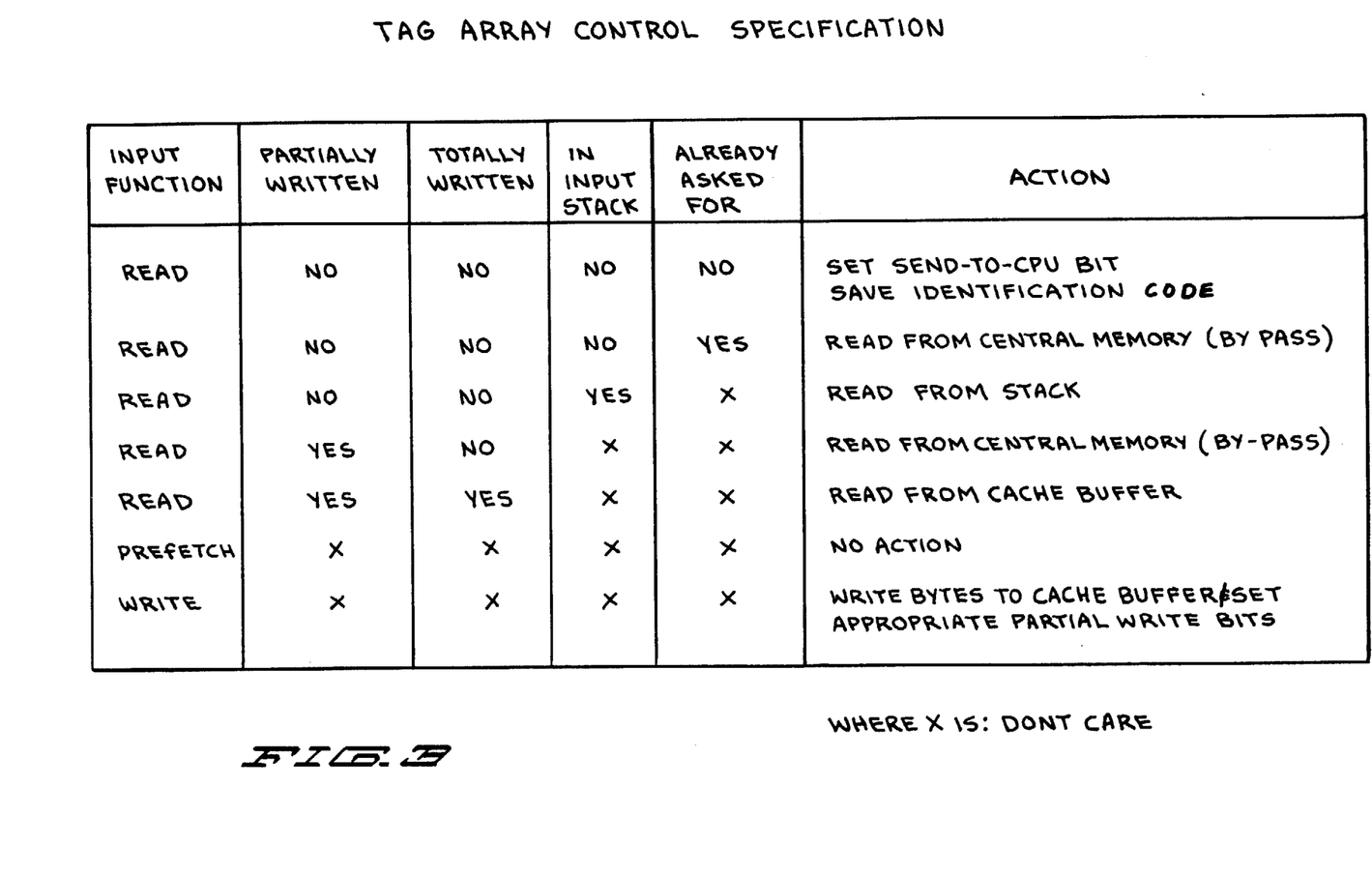
FIG. 3 is a table specifying the actions performed by the tag array control unit 18 on a previous miss hit.

The table of FIG. 3 indicates the actions followed by the tag array control under all of the above conditions. Note that central memory is only accessed if the word has been previously asked for or has been partially written. These infrequent central memory accesses may also be eliminated by one skilled in the art with additional logic in units 30 and 56.

On a miss, a miss information holding register is assigned in unit 30 and the following tasks are performed:
(a) valid indicator set;
(b) obsolete indicator cleared;
(c) cache buffer address saved in assigned miss information holding register;
(d) input request address saved in assigned miss information holding register;
(e) appropriate send-to-CPU indicator set and others cleared;
(f) input identification tag saved in appropriate position;
(g) all partial write codes associated with assigned miss information holding register are cleared and
(h) all miss information holding registers pointing to the same cache buffer address are purged, meaning that the partial write code is set to all ones.

Note that actions (e) and (f) will vary if the cache memory function was a prefetch, meaning that all send-to-CPU indicators are cleared and no tag is saved. Action (h) is performed to prevent data from a previous allocation of a cache memory buffer block from overwriting the present allocation's data. On a miss and previous miss hit where the cache buffer block was reallocated for the same input address before all the data was received, the miss information holding register is set obsolete in order to prevent possible subsequent multiple hits in the miss comparator 34.

There is definitely a possibility of having a previous miss hit on a data word just being received. Depending on the control operation, this word may have its corresponding send-to-CPU indicator output forced to the send condition or may be read out of the input stack 40 on the next minor cycle of the processor.

In order to be able to diagnose this cache memory enhancement more readily, it would be advisable to add the cache memory input functions to clear and set the valid indicators of the miss information holding register unit's 30 individual registers. A function code to tell the cache memory what to perform is associated with each input request address 22 and 24 of FIG. 1. The above would allow one to test the following error conditions:

(a) cache tag points to nonvalid miss information holding register;
(b) multiple hits in the miss information holding register comparator and
(c) previous miss hit status totally written and not partially written.

All the other fields of the miss information holding register units may be verified by the use of the above special cache memory input functions in combination with the standard input functions having all combinations of address, identification tags and data.

What is claimed is:

1. A cache memory organization comprised of;
    a cache memory unit,
    selection unit means for selecting the input to said cache memory unit,
    a tag arrays and control unit means connected to and for providing a first data input for forming a first address input to said selection unit means,
    input stack means connected to and for providing a second data input to said selection unit means,
    a miss information holding registers unit connected to and for providing a third data input for forming a second address input to said selection unit means, wherein said miss information holding registers unit receives an input from said tag arrays and control unit means, wherein said miss information holding registers unit holds a predetermined number of required addresses not found in said cache memory unit when said cache memory unit is addressed and misses,
    a miss information comparator and status collection network connected to said miss information registers holding unit and receiving input request and cache memory addresses from said tag arrays and control unit means and for providing status information to said tag arrays and control unit means,
    a memory receiver unit for receiving data from a central memory of a computer system, said memory receiver unit being connected to said input stack means and to said miss information holding registers unit for providing addresses to said input stack means under control of said miss information holding registers unit,
    an output selection network for the cache memory organization having a first input from the cache memory unit, a second input from said input stack means and a third input from said memory receiver unit wherein said cache memory organization is not locked up when said cache memory unit is addressed and misses by means of said miss information holding registers unit holding miss addresses until said memory receiver unit receives the required miss address information while said tag arrays and control unit means continues to provide addresses to said cache memory unit through said selection unit means.

2. The cache memory organization of claim 1 in which said miss information holding register unit consists of a predetermined number of registers of each of the following types:
    a cache memory address register,
    an input request address register,
    an identification tags register,
    a send-to-CPU indicators register,
    a partial write code register,
    an in-input-stack indicators register, and
    a control information register.

3. The cache memory organization of claim 2 in which the predetermined number of each of said registers is 4.

4. The cache memory organization of claim 1 in which the miss information comparator has a predetermined number of ways of comparison and is comprised of:
    a predetermined number of selectors to send status information to the tag array control unit,
    a predetermined number of selectors to send the cache memory address and partial write code to select unit,
    a predetermined number of selectors to send control, selected identification tag and send to CPU indicator information to the memory receiver,
    network means for forming the logical product and logical sum for the totally written out and partially written status registers,
    and a hit resolve network to determine from the compare outputs the single and multiple hit status for the tag array control.

5. The cache memory organization of claim 4 in which the predetermined number for each of said means is 4.

6. The cache memory organization of claim 1 in which said miss information holding register unit consists of a predetermined number of registers of each of the following types:
    a cache memory address register,
    an input request address register,
    an identification tags register,
    a send-to-CPU indicators register,
    a partial write code register,
    an in-input-stack indicators register, and
    a control information register and
    in which the miss information comparator has a predetermined number of ways of comparison and is comprised of:
    a predetermined number of selectors to send status information to the tag array control unit,
    a predetermined number of selectors to send the cache memory address and partial write code to select unit,
    a predetermined number of selectors to send control, selected identification tag and send to CPU indicator information to the memory receiver, network means for forming the logical product and logical sum for the totally written out and partially written status registers, and a hit resolve network to determine from the compare outputs the single and multiple hit status for the tag array control.

7. The cache memory organization of claim 6 in which the predetermined number for each of said means is 4.

* * * * *